(12) United States Patent
Hirano et al.

(10) Patent No.: US 7,277,258 B2
(45) Date of Patent: Oct. 2, 2007

(54) DUAL-STAGE ACTUATOR DISK DRIVE WITH OPTIMAL LOCATION OF THE MOVABLE PORTION OF THE SECONDARY ACTUATOR

(75) Inventors: Toshiki Hirano, San Jose, CA (US); Fu-Ying Huang, San Jose, CA (US); Tetsuo Semba, San Jose, CA (US); Matthew T. White, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 352 days.

(21) Appl. No.: 11/158,445

(22) Filed: Jun. 21, 2005

(65) Prior Publication Data

US 2006/0285256 A1   Dec. 21, 2006

(51) Int. Cl.
*G11B 5/596* (2006.01)
*G11B 21/10* (2006.01)
*G11B 21/20* (2006.01)

(52) U.S. Cl. .............................. 360/294.3; 360/294.4; 360/294.5

(58) Field of Classification Search ............. 360/294.3, 360/294.4, 294.5
See application file for complete search history.

(56) References Cited

U.S. PATENT DOCUMENTS

| | | | |
|---|---|---|---|
| 5,781,381 A | | 7/1998 | Koganezawa et al. |
| 6,141,188 A | * | 10/2000 | Bauck et al. ............ 360/245.4 |
| 6,376,964 B1 | | 4/2002 | Young et al. |
| 6,587,313 B2 | * | 7/2003 | Kurihara et al. ......... 360/294.4 |
| 6,617,763 B2 | * | 9/2003 | Mita et al. ................... 310/328 |
| 6,621,653 B1 | | 9/2003 | Schirle |
| 6,721,124 B2 | | 4/2004 | Chang et al. |
| 6,747,836 B2 | | 6/2004 | Stevens et al. |
| 6,778,350 B2 | | 8/2004 | Bonin et al. |
| 6,870,710 B2 | * | 3/2005 | Hida et al. ............... 360/294.4 |
| 6,961,221 B1 | * | 11/2005 | Niu et al. ................ 360/294.4 |
| 7,006,335 B2 | * | 2/2006 | Kuwajima et al. ....... 360/294.4 |
| 7,027,267 B2 | * | 4/2006 | Kuwajima et al. ....... 360/294.4 |
| 7,106,557 B2 | * | 9/2006 | Kuwajima et al. ....... 360/294.4 |
| 2004/0095672 A1 | | 5/2004 | Price |
| 2006/0146449 A1 | * | 7/2006 | Yao et al. ................ 360/294.4 |

OTHER PUBLICATIONS

"Shock-Resistant Rotary Microactuator for Fine Positioning of recording Heads," Aug. 1994, IBM Technical Disclosure Bulletin, vol. 37, No. 08, pp. 401-404.*

Kuwajima et al., "Thin-Film Piezoelectric DSA for HDD", IEEE Transactions on Magnetics, vol. 38, No. 5, Sep. 2002, pp. 2186-2188.

* cited by examiner

*Primary Examiner*—William J Klimowicz
(74) *Attorney, Agent, or Firm*—Thomas R. Berthold

(57) ABSTRACT

A dual-stage actuator disk drive has both a rotary primary actuator and a rotary secondary actuator. When the primary actuator initiates a seek there are two torque components acting on the center of mass of the secondary actuator's moving portion. The center of rotation of the moving portion is located at an optimal location relative to the center of mass of the moving portion, which results in cancellation of the two torque components and a secondary actuator that has essentially no resonant frequency in response to a seek by the primary actuator. If the optimal location can not be achieved because of assembly tolerances, then the center of rotation is placed at a distance at least as great as the assembly tolerance from the optimal location.

19 Claims, 10 Drawing Sheets

DUAL-STAGE ACTUATOR DISK DRIVE WITH OPTIMAL LOCATION OF THE MOVABLE PORTION OF THE SECONDARY ACTUATOR

BACKGROUND OF THE INVENTION

1. Field of the Invention

This invention relates generally to magnetic recording hard disk drives, and more particularly to a disk drive with a dual-stage actuator for positioning the read/write heads.

2. Description of the Related Art

Magnetic recording hard disk drives with dual-stage actuators for positioning the read/write heads on the disks have been proposed. A rotary voice-coil-motor (VCM) is typically the primary actuator, with the secondary actuator attached to the VCM and the read/write heads attached to the secondary actuator. A servo control system receives servo positioning information read by the read/write heads from the data tracks and generates control signals to the primary and secondary actuators to maintain the heads on track and move them to the desired tracks for reading and writing of data. As in conventional single-stage actuator disk drives, each read/write head is attached to the end of a head carrier or air-bearing slider that rides on a cushion or bearing of air above the rotating disk. The slider is attached to a relatively flexible suspension that permits the slider to "pitch" and "roll" on the air bearing, with the suspension being attached to the end of the VCM actuator arm.

The secondary actuator is typically a piezoelectric, electrostatic or moving-coil type of "milliactuator" located on the VCM actuator arm for moving the suspension (a "moving-suspension" secondary actuator), or a "microactuator" located on the suspension for moving the slider (a "moving-slider" secondary actuator).

One of the problems in a dual-stage actuator disk drive is that when the primary actuator is activated, it generates a relatively large acceleration at the secondary actuator, causing secondary actuator vibration. For example, when a "seek" operation is performed by the primary actuator to move the read/write head from one track to another track, the large acceleration during the seek can cause the secondary actuator to vibrate, resulting in a longer seek time and thus degraded performance of the disk drive. Moreover, if the resonance of the secondary actuator shows up in the transfer function of the primary actuator, the performance of the servo control system can be degraded.

What is needed is a dual-stage actuator disk drive that eliminates or minimizes secondary actuator vibration and resonance caused by acceleration of the primary actuator.

SUMMARY OF THE INVENTION

This invention is dual-stage actuator disk drive that has both a rotary primary actuator and a rotary secondary actuator. The secondary actuator has a fixed portion attached to the primary actuator and a movable portion that supports the read/write head and rotates about a center of rotation relative to the fixed portion. When the primary actuator initiates a seek there are two torque components acting on the center of mass of the secondary actuator's moving portion. The first component is due to the torque associated with the angular acceleration of the primary actuator and is a function of the moment of inertia of the moving portion. The second component is due to the linear force applied at the center of mass by the angular acceleration of the primary actuator and is a function of the mass of the moving portion, the distance of the moving portion's center of mass from the rotational axis of the primary actuator, and the distance between the moving portion's center of mass and center of rotation. By proper selection of the optimal location of the center of rotation relative to the center of mass, the two torque components are made to cancel so that the secondary actuator has essentially no resonant frequency in response to a seek by the primary actuator.

Because of assembly tolerances in attachment of the moving portion to the fixed portion of the secondary actuator, it is not always possible to achieve the optimal location. In that case the location of the center of rotation is placed at a distance at least as great as the assembly tolerance from the optimal location. This assures stability of the primary actuator operation by assuring that the phase of the primary actuator transfer function near the resonant frequency always moves one way or the other, i.e., phase lead or lag. The direction of the location of the center of rotation from the optimal location is determined by a determination of whether the dual-stage actuator has positive coupling (positive rotation of the secondary actuator in response to positive rotation of the primary actuator) or negative coupling (negative rotation of the secondary actuator in response to positive rotation of the primary actuator).

The invention is applicable to both moving-suspension and moving-slider rotary secondary actuators, and to piezoelectric, electrostatic and moving-coil types of secondary actuators.

For a fuller understanding of the nature and advantages of the present invention, reference should be made to the following detailed description taken together with the accompanying figures.

DETAILED DESCRIPTION OF THE INVENTION

Figure 1:
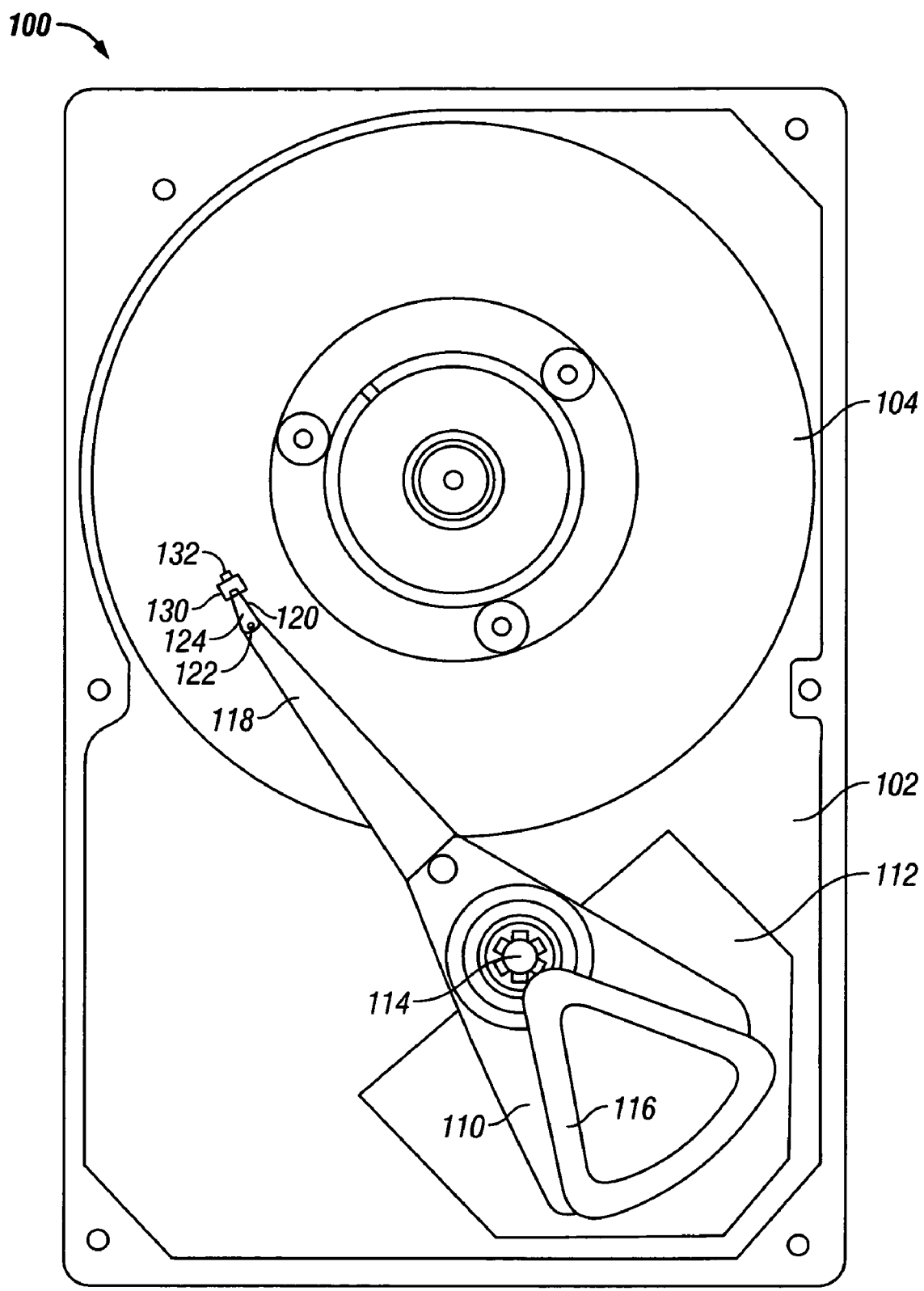
FIG. 1 is a block diagram of a prior art dual-stage actuator disk drive.

FIG. 1 is a schematic diagram of a prior art dual-stage-actuator disk drive of the type for which the present invention is applicable. The disk drive, designated generally as 100, includes a base or housing 102, a data recording disk 104, a rotary voice coil motor (VCM) 110 as the primary actuator, a rotary secondary actuator 120, a suspension 124, a head carrier or air-bearing slider 130, and a data recording transducer 132 (also called a head, recording head or read/write head) located on the trailing or end face of the slider 130.

The VCM actuator includes a magnet assembly 112 fixed to housing 102, a movable portion that rotates about axis 114 and includes a coil assembly 116 and a rigid arm 118. The secondary actuator 120 is a movable-suspension type that has a fixed portion attached to the arm 118 and a movable portion that rotates about axis 122. The movable portion of secondary actuator 120 includes the suspension 124 and slider 130 with attached head 132.

The recording head 132 is typically a combination of an inductive write head with a magnetoresistive read head and is located on the trailing or end face of slider 130. Slider 130 is supported by the suspension 124 that enables the slider to "pitch" and "roll" on an air-bearing generated by the rotating disk 104. Typically, there are multiple disks stacked on a hub that is rotated by a disk motor, with a separate slider and recording head associated with each surface of each disk.

Figure 2:
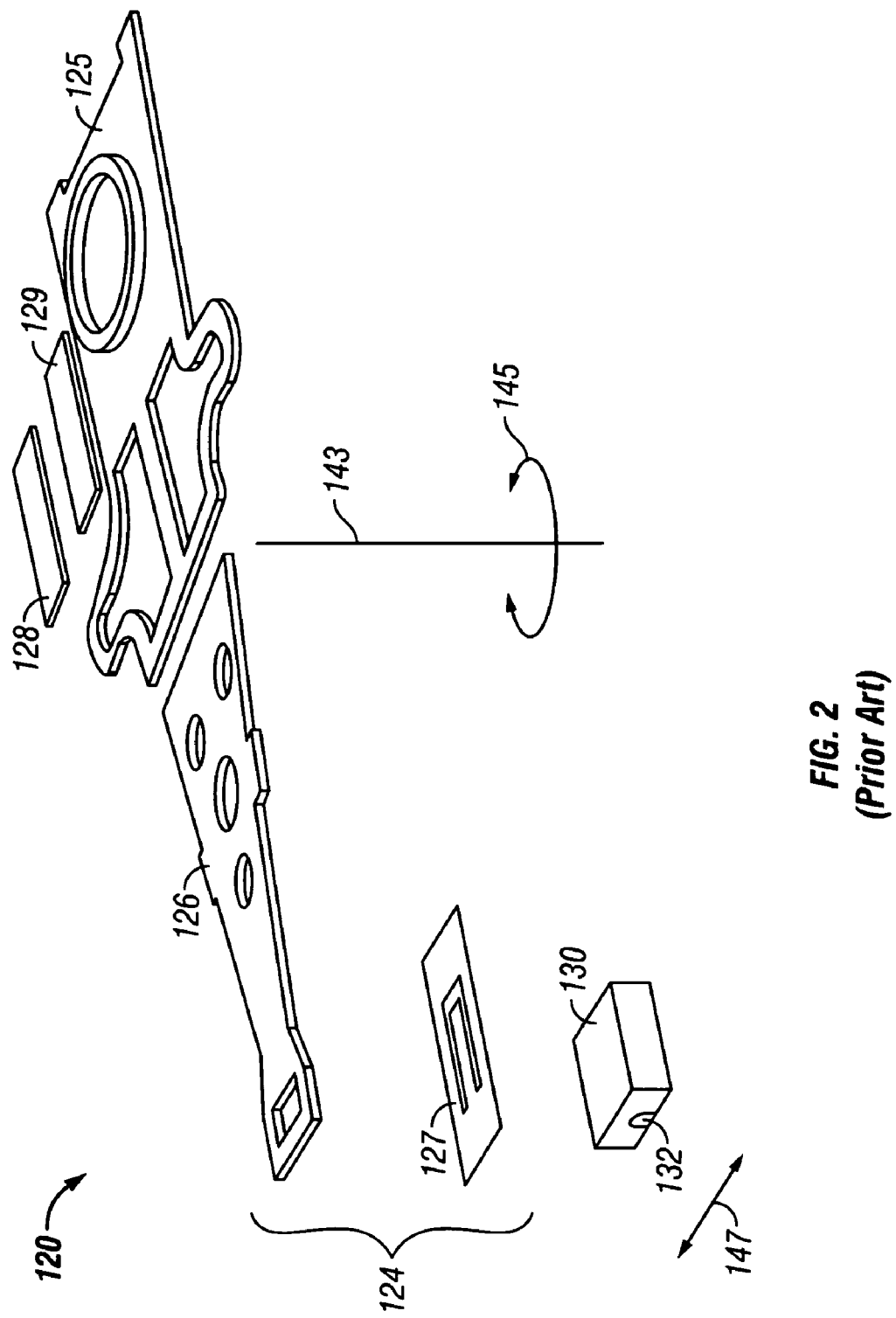
FIG. 2 is a detailed exploded view of a prior art moving-suspension rotary secondary actuator of the disk drive in FIG. 1.

FIG. 2 is a detailed exploded view of the secondary actuator 120. The secondary actuator 120 includes a fixed portion 125 that is mounted to the rigid arm 118 of the primary actuator, and a movable portion that includes the suspension 124 (load beam 126 plus flexure 127) and slider 130 that is attached to flexure 127 and supports the recording head 132. The movable portion also includes piezoelectric elements 128, 129, typically formed of lead zirconate titanate (PZT). When one of the piezoelectric elements contracts while the other expands the movable portion rotates about an effective axis of rotation 143, as indicated by arrow 145. This cause cross-track movement of head 130, as indicated by arrow 147. This type of rotary moving-suspension secondary actuator is a piezoelectric actuator, as described for example in U.S. Pat. No. 6,621,653 B1, but electrostatic and moving-coil or VCM rotary moving-suspension secondary actuators are also well-known.

Figure 3:
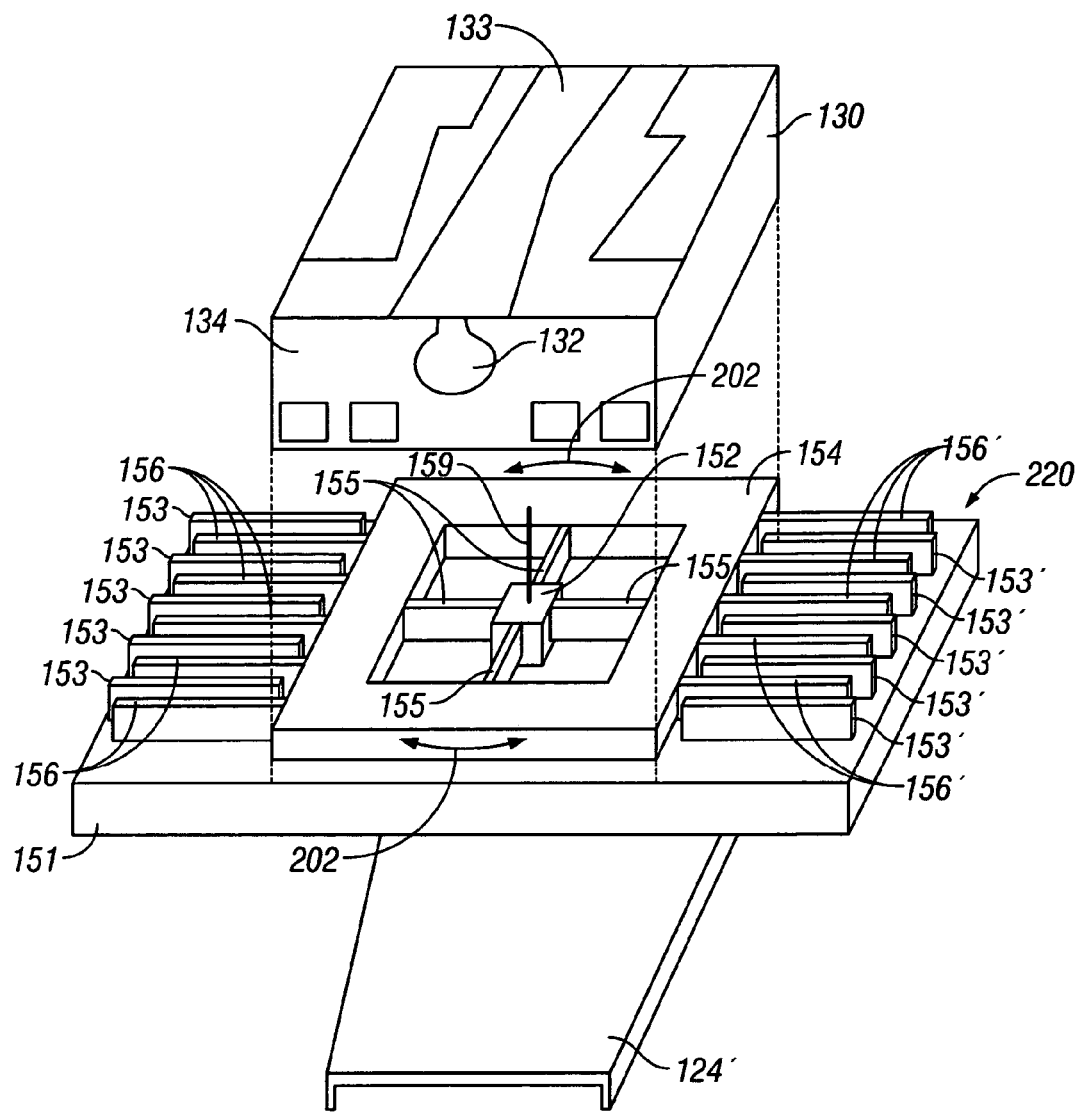
FIG. 3 is a view of a prior art moving-slider rotary secondary actuator usable with a dual-stage actuator disk drive.

The secondary actuator may also be a rotary moving-slider type of secondary actuator. FIG. 3 is an exploded view a rotary electrostatic moving-slider secondary actuator, as described in U.S. Pat. No. 5,959,808, and shows the secondary actuator 220, the disk drive suspension 124', and the air-bearing slider 130 with recording head 132. The slider 130 has an air-bearing surface 133 that faces the disk of the disk drive and a trailing or end face 134 that supports the head 132. An insulating substrate 151, which is typically a silicon base with an insulating surface layer, such as a layer of polyimide, silicon oxide or silicon nitride is fixed to suspension 124'. The fixed portion of the secondary actuator 220 includes the substrate 151, a central post 152 fixed to substrate 151 and two sets of stationary electrodes 153, 153' also fixed to substrate 151. The movable rotary portion of the secondary actuator 220 includes a support frame 154, a plurality of flexible members or springs 155 connecting the frame 154 to the fixed post 152, a plurality of movable electrodes depicted as two sets 156, 156' attached to frame 154, as well as the slider 130 with head 132. The sets of movable electrodes 156, 156' are interleaved with the sets of fixed electrodes 153, 153', respectively. The frame 154 may optionally support a platform to which the slider 130 is bonded. A voltage applied to stationary electrodes 153 will apply an electrostatic attractive force between stationary electrodes 153 and movable electrodes 156, tending to cause the frame 154 to rotate counterclockwise about an axis 159 through post 152. A voltage applied to stationary electrodes 153' will apply an electrostatic attractive force between stationary electrodes 153' and movable electrodes 156', tending to cause the frame 154 to rotate clockwise. Thus a first set of stationary electrodes 153 and movable electrodes 156 are associated with counterclockwise rotation and a second set of stationary electrodes 153' and movable electrodes 156' are associated with clockwise rotation. The frame 154 rotates (as depicted by arrows 202) about an axis 159 due to the flexibility of the springs 155 and thus moves the head 132 in the cross-track direction to maintain its position on a data track on the disk.

One of the problems with dual-stage actuator disk drives is that when the primary actuator is activated to move the head across the disk, a process referred to as a track "seek", a relatively large acceleration is generated at the area near the secondary actuator, causing secondary-actuator vibration. This vibration results in a longer seek time and thus degraded performance. In addition, if the secondary actuator has a natural resonant frequency within the frequency range of the transfer function of the primary actuator, the performance of the primary actuator's servo control system can be degraded.

Figure 4:
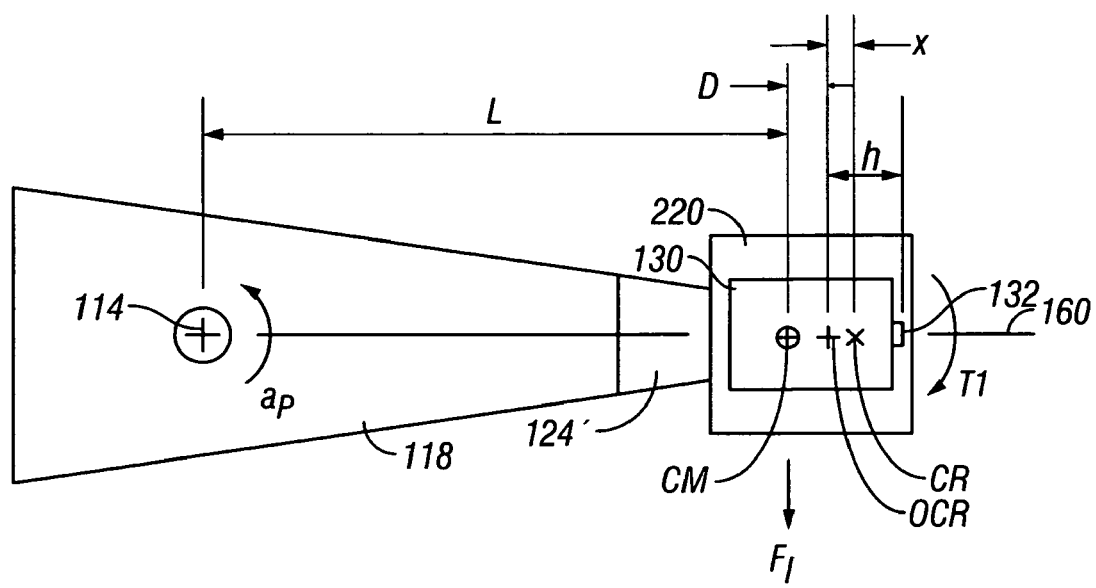
FIG. 4 is a schematic illustration of a moving-slider rotary secondary actuator mounted to the rigid arm of the primary actuator and depicting the relative locations of the center of mass and center of rotation.

FIG. 4 is a schematic illustration of the problem for a moving-slider rotary secondary actuator, but the problem is also applicable to moving-suspension rotary secondary actuators. When the primary actuator, e.g., a VCM actuator, is activated, it generates an angular acceleration $a_p$ around the pivot axis 114. This causes two components of torque at the center of rotation 159 (FIG. 3) of the secondary actuator's moving portion (the platform 154, electrodes 153', 156' and slider 130 in FIG. 3). The first torque component is due to the torque associated with $a_p$ and is given by the following expression:

$$T1 = -(I_z * a_p), \quad \text{Equation (1)}$$

where $I_z$ is the moment of inertia of the secondary actuator moving portion about its center of rotation. The second torque component is due to the linear force applied at the center of mass of the secondary actuator moving portion. This linear force is given by the following expression:

$$F_1 = a_{sl} * M, \quad \text{Equation (2)}$$

where M is the mass of the secondary actuator moving portion, and $a_{sl}$ is the linear acceleration of the secondary actuator at its center of mass (CM) in a direction substantially perpendicular to a line 160 that intersects 114 and CM. Because $a_{sl} = (a_p * L)$, then $F_1$ can be given by the following expression:

$$F_1 = (a_p * L) * M, \quad \text{Equation (3)}$$

where L is the distance between rotational axes 114 and center of mass of the secondary actuator. The secondary actuator moving portion's center of mass CM is offset from the optimal center of rotation (OCR) by a distance D along the line 164. Thus the force $F_1$ generates a torque component T2 about the center of rotation OCR given by the following expression:

$$T2 = (a_p * L) * M * D. \quad \text{Equation (4)}$$

In this invention the optimal center of rotation (OCR) of the secondary actuator 220 is positioned by selection of the value of D such that T1+T2=0, i.e., the two torque components cancel. When the secondary actuator is a moving-slider type, like that shown in FIG. 3, then the desired location of the center of rotation is selected by proper placement of the center post 152 on platform 154. Thus D is chosen according to the following expression:

$$D=I_z/(L*M) \qquad \text{Equation (5)}$$

With this value of D, the center of rotation is at the optimal location OCR and the disturbance torque acting on the secondary actuator is always zero, regardless of the VCM acceleration, $a_p$. The center of mass of the moving portion is known or can be determined, so the location 159 (FIG. 3) of the center of rotation can be selected to satisfy Equation (5).

Figure 5A:
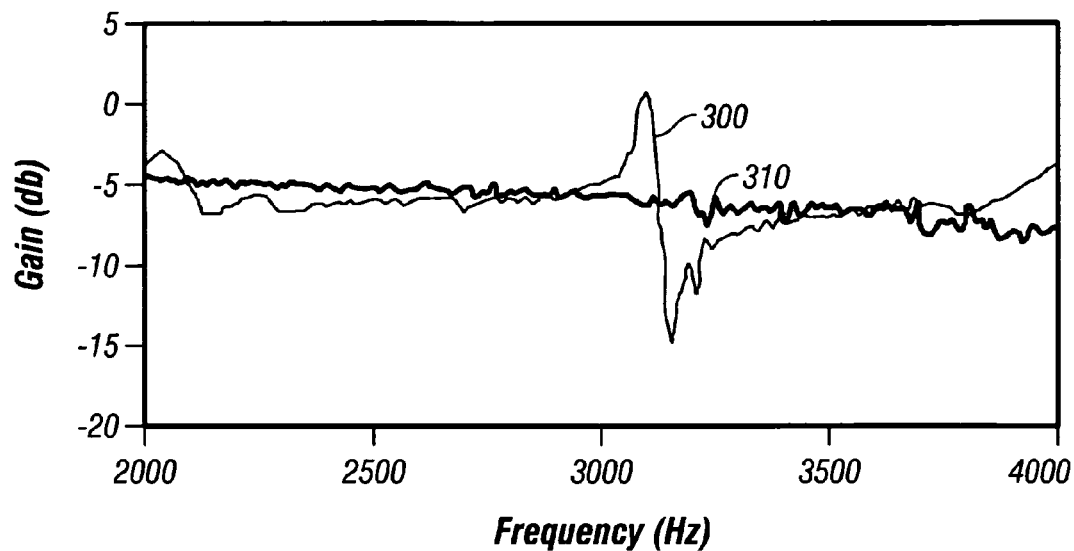
FIG. 5A shows the gains and FIG. 5B shows the phases of the transfer function of the VCM primary actuator without proper selection of the secondary actuator's center of rotation (line 300) compared with the transfer function with selection of the center of rotation according to the present invention (line 310).
Figure 5B:
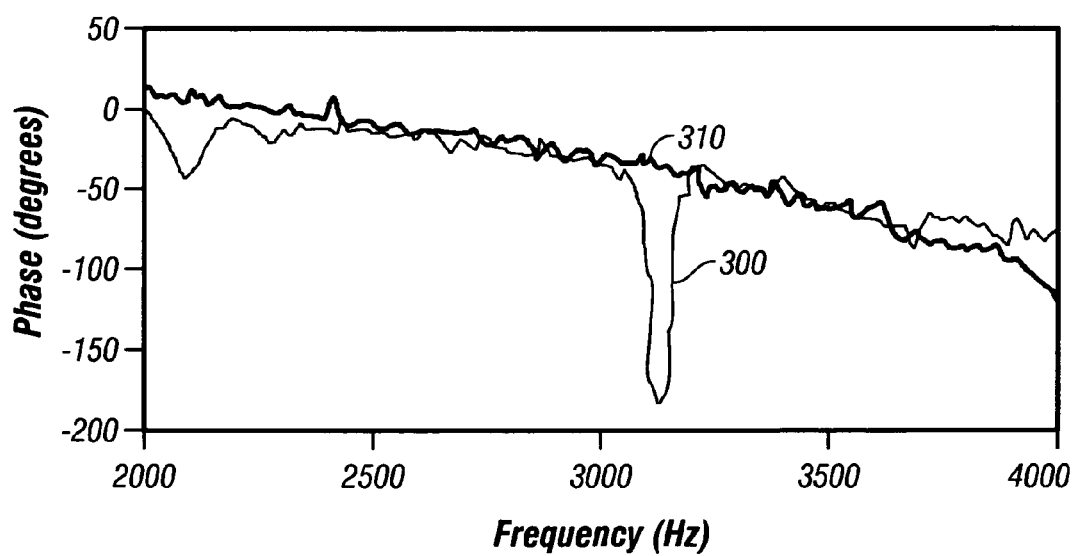

FIGS. 5A-5B show an experimental result of the invention. The graph is the transfer function of the VCM primary actuator, i.e., VCM current as input, head position as output. Line 300 shows the transfer function of the VCM without proper selection of D. The secondary actuator has a resonant frequency at about 3.1 kHz. Line 310 shows the transfer function with D selected according to Equation (5) and shows that the secondary actuator has no resonance. In this example the center of rotation was moved by 25 microns from its position that generated line 300.

Because of assembly tolerances it may not always be possible to locate the secondary actuator precisely at the optimal location on the primary actuator to satisfy Equation (5) and thereby substantially eliminate vibration of the secondary actuator in response to a seek by the primary actuator. However, by use of the known assembly tolerances the center of rotation can be shifted further away from this optimal location to assure stable operation. This assures that the phase near the resonant frequency moves one way or the other, i.e., phase lead or lag.

To explain this aspect of the invention it is assumed that the VCM generates only a linear acceleration around the secondary actuator, i.e., angular acceleration is neglected. It is also assumed that the secondary actuator is a spring-mass-damper system, which is a relatively good approximation of the first resonant frequency of the secondary actuator. The transfer function from VCM current to head position is then expressed by the following equations:

$$P(s)=1/s^2+h*Um/(I_zs^2+cs+k) \qquad \text{Equation (6)}$$

for positive coupling, or $$P(s)=1/s^2-h*Um/(I_zs^2+cs+k) \qquad \text{Equation (7)}$$

for negative coupling, where h is the distance between the center of rotation of the secondary actuator and the head, Um is the imbalance of the moving mass of the secondary actuator (Um=M*D), c is the damping coefficient, and k is the spring constant of the secondary actuator. For positive coupling, when a counter-clockwise acceleration is generated by the VCM, the slider rotates counter-clockwise, resulting in the motion of the head in the same direction as the acceleration. For negative coupling, when a counter-clockwise acceleration is generated by the VCM, the slider rotates clockwise, resulting in motion of the head in the opposite direction.

Stability of the VCM servo loop can be assured by selection of either positive or negative coupling, depending on the characteristics of the VCM servo. If the phase of the open-loop transfer function of the VCM servo loop, i.e., the controller transfer function multiplied by the VCM mechanical transfer function, without the secondary actuator at the resonant frequency of the secondary actuator is between 0 degree and −180 degree, positive coupling should be selected. If the phase of the open-loop transfer function of the VCM servo loop, i.e., the controller transfer function multiplied by the VCM mechanical transfer function, without the secondary actuator at the resonant frequency of the secondary actuator is between −180 degree and −360 degree, negative coupling should be selected. This assures that the phase does not cross the −180 degree line, which can cause instability of servo system. Note that the phase of the VCM mechanical transfer function without the secondary actuator is always at −180 degree for the ideal case. A controller connected series to the VCM is designed to give phase offset; either phase lead (positive phase) or phase lag (negative phase) to the VCM. When the controller is designed to have phase lead at a particular frequency, the phase of the VCM servo loop (the multiplication of the controller transfer function and the VCM transfer function) at that frequency is between −180 and 0 degree (−180 degree+positive phase). When the controller is designed to have a phase lag at a particular frequency, the phase of the VCM servo loop at that frequency is between −360 and −180 degree (−180 degree+ negative phase).

Figure 6A:
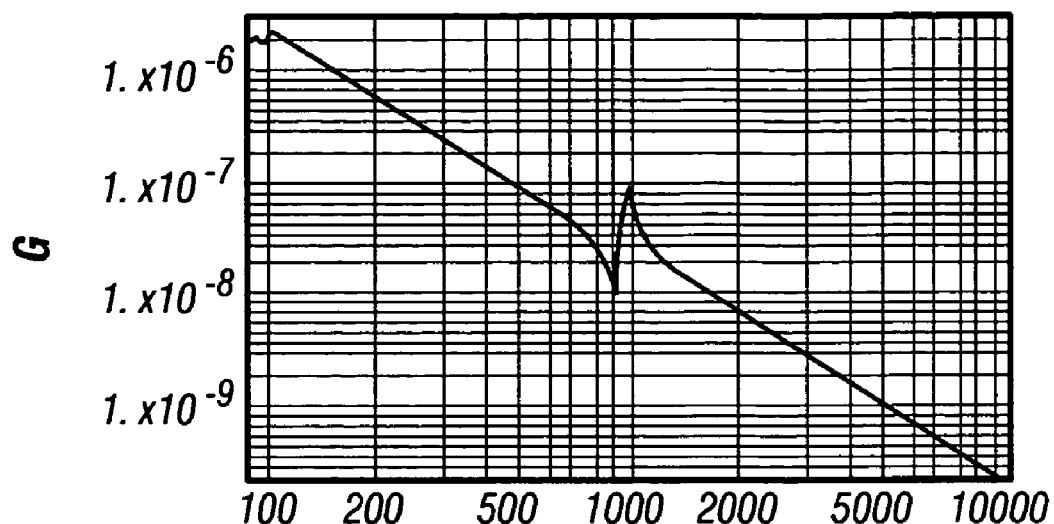
FIG. 6A is the gain and FIG. 6B the phase of the VCM mechanical transfer function (VCM current as input, head position as output) for positive coupling.
Figure 6B:
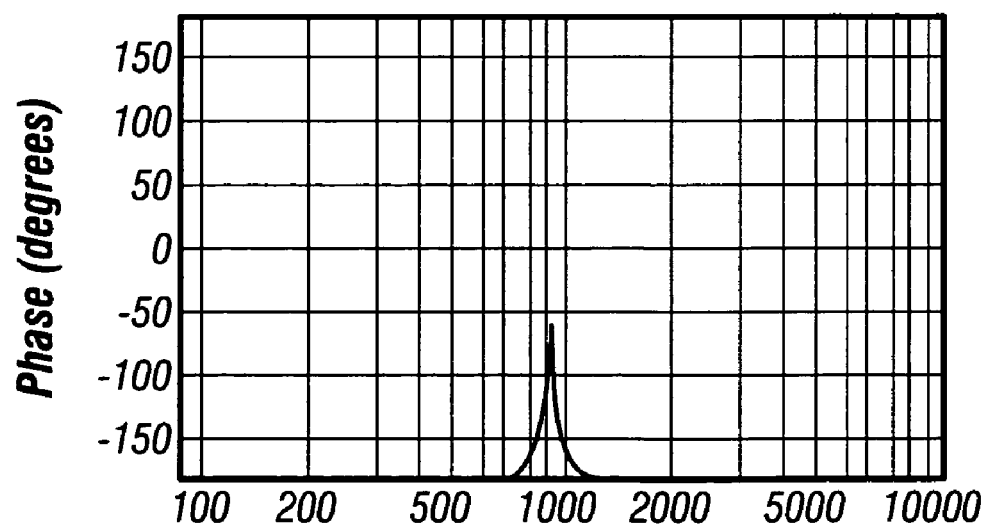
FIG. 6C is a graphical illustration of VCM servo stability for the positive coupling case of FIGS. 6A-6B.
Figure 6C:
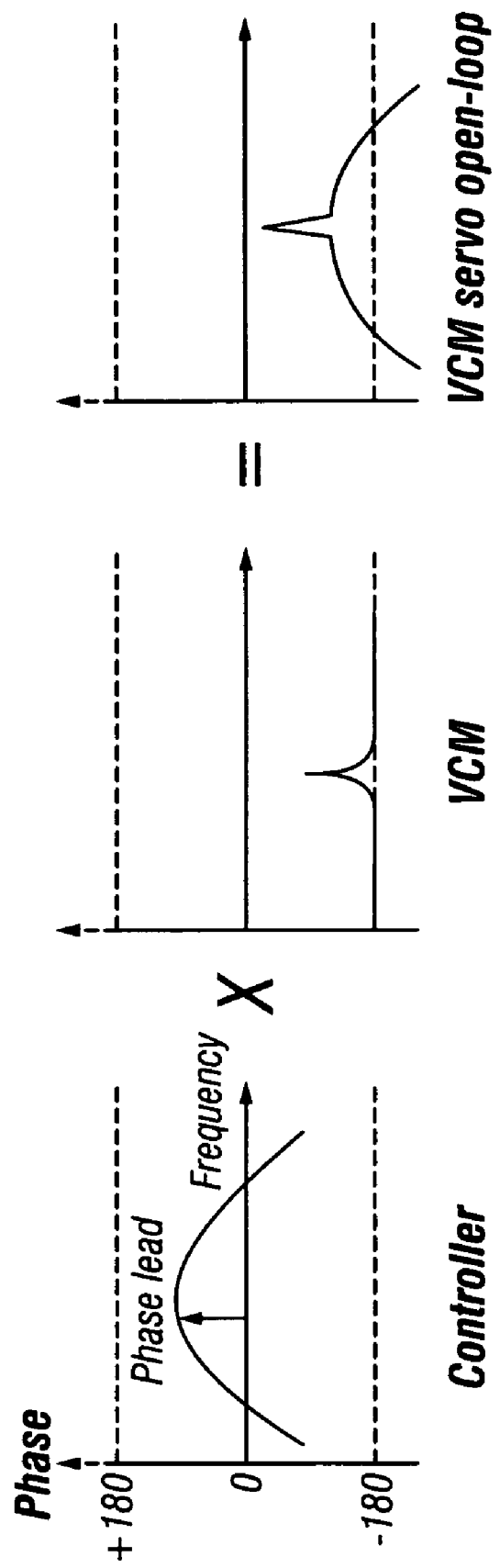
Figure 7A:
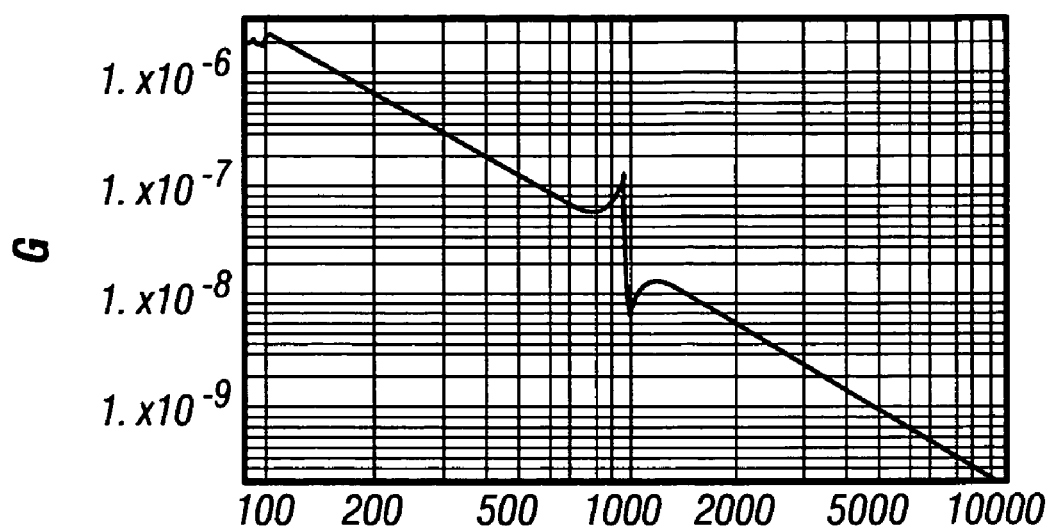
FIG. 7A is the gain and FIG. 7B the phase of the VCM mechanical transfer function (VCM current as input, head position as output) for negative coupling.
Figure 7B:
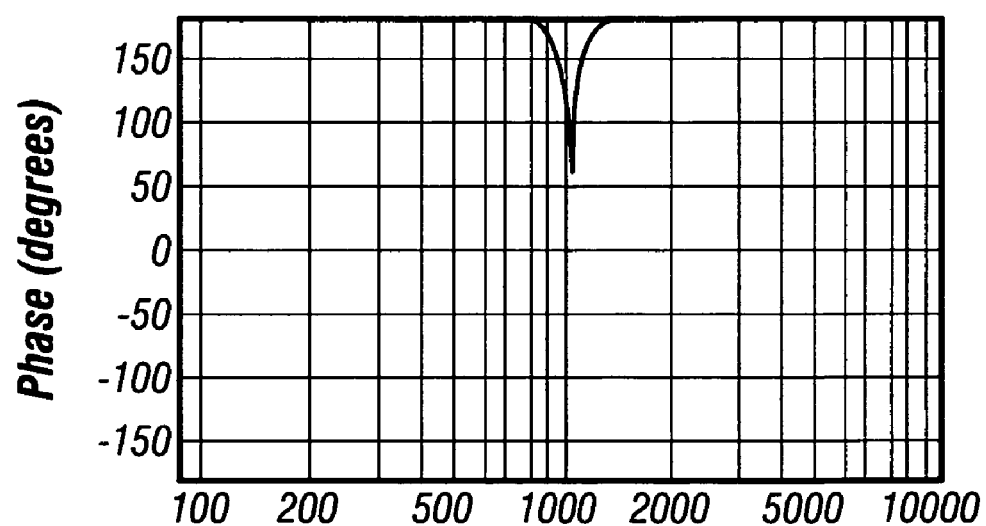
FIG. 7C is a graphical illustration of VCM servo stability for the negative coupling case of FIGS. 7A-7B.
Figure 7C:
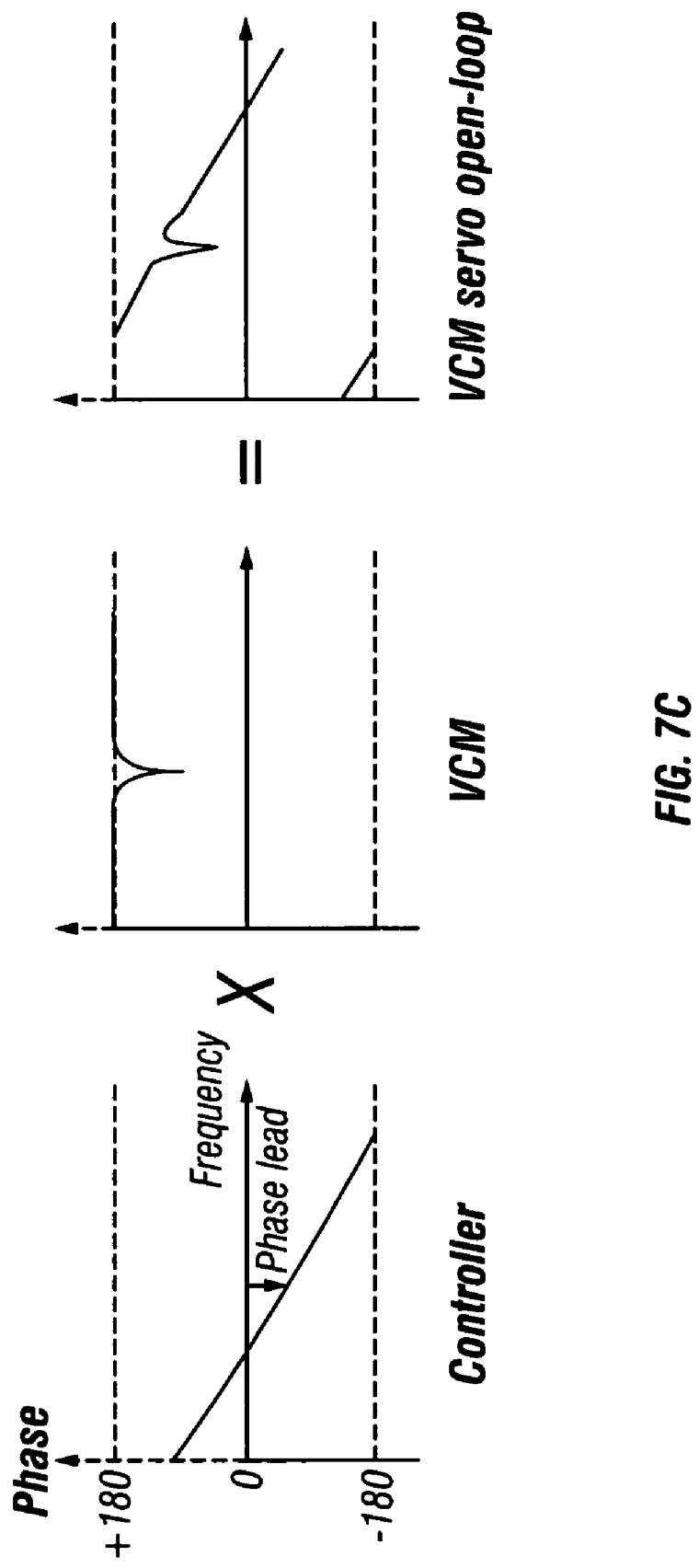

An example of a VCM mechanical transfer function for positive coupling is shown in FIGS. 6A-6B. In this example, the resonant frequency of the secondary actuator is around 1 kHz. If there were no secondary actuator, the VCM transfer function is just $1/s^2$, i.e., a straight line in gain, and a −180 degree phase. However, due to the resonance of the secondary actuator, the gain shows small peak at 1 kHz, and the phase around 1 kHz goes up from −180 degrees. FIG. 6C shows a graphical illustration of servo stability in this situation. If the controller gives phase lead (positive phase) around this frequency, the phase of the open-loop transfer function of the VCM servo loop should move further away from −180 degree line, and thus stability is assured. A similar example of a VCM mechanical transfer function for negative coupling is shown in FIGS. 7A-7B. In this case, the phase around 1 kHz goes down from 180 degrees. FIG. 7C shows a graphical illustration of servo stability in this situation. If the controller gives phase lag (negative phase) around this frequency, the phase of the open-loop transfer function of the VCM servo loop should move further away from the −180 degree line, and thus stability is assured.

Figure 8A:
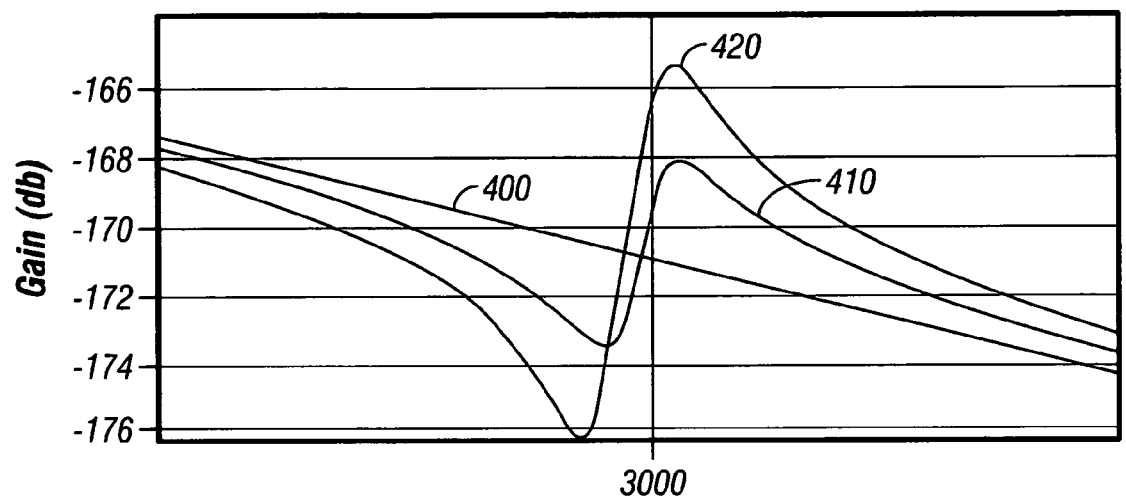
FIG. 8A shows the gain, i.e., the secondary actuator vibration response to a VCM current input, and FIG. 8B the phase around the secondary actuator resonant frequency for three locations of the secondary actuator's center of rotation.
Figure 8B:
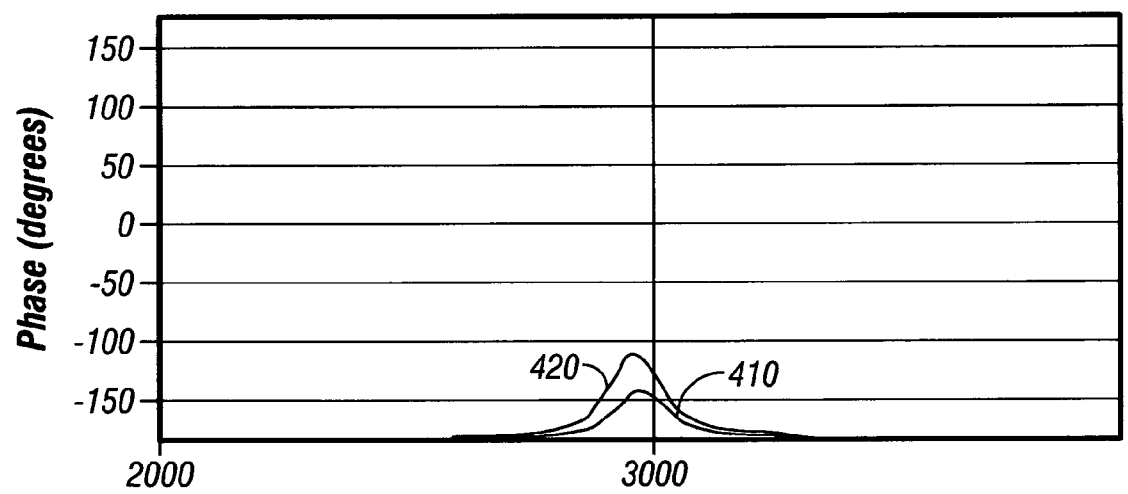

To assure stability when Equation (5) can not be satisfied because of the assembly tolerance in locating the center of rotation relative to the center of mass, the center of rotation (CR in FIG. 4) is shifted by at least a distance X from the optimal location OCR, where the value of X is the assembly tolerance. This is shown in FIG. 4 for the case of positive coupling where the center of rotation has been shifted from the optimal location (distance L+D from VCM pivot axis 114) by the distance X in the direction away from the VCM pivot axis 114. This assures that after assembly the center of rotation will be located at least at the optimal location, and that in the nominal case, where there is no error in the assembly, the center of rotation will be at D+X. FIGS. 8A-8B show the results of an example where the assembly tolerance is assumed to be +/−10 microns (X is equal to 10 microns), meaning that the error in locating the center of rotation can be between −10 microns and +10 microns. The upper graph (FIG. 8A) is the gain, i.e., the secondary actuator vibration response to a VCM current input, and the lower graph (FIG. 8B) is phase. This graph shows how the transfer function changes due to the assembly tolerance. When there is no assembly error (the nominal case), the distance between the center of mass and the center of rotation is D+X, or (D+10 microns). Since this location is only a small distance (10 microns) from the optimal location in the direction away from VCM pivot axis 114, there is small and "positive" coupling, as shown by line 410. When the assembly error is −10 microns, the distance is (D+X−10 microns), or D. In this case, the center of rotation is at the optimal location, and there is no coupling, as shown by line 400. On the other hand, when the assembly error is +10 microns, the distance is (D+X+10 microns), or (D+2X) or (D+20 microns). Since this location is 20 microns away from the optimal location in the direction away from VCM pivot axis 114, the coupling is a little larger, but still positive, as shown by line 420. So for positive coupling when the absolute value of assembly tolerance is X, the center of rotation is located between L+D and L+D+2X. For all of these three cases, the phase (FIG. 8B) does not go in the negative direction, so positive coupling is assured. For the example of negative coupling, the offset X would be from the optimal location in the direction toward the VCM pivot axis 114 and the center of rotation is located between L+D−2X and L+D. From the same discussion as above, negative coupling is assured.

The invention has been described above and illustrated in FIG. 4 with the offset from the optimal location being the distance X, which is the absolute value of the assembly tolerance for the location of the center of rotation relative to the center of mass. However, in an actual design it may be desirable to include a safety margin for the offset distance because there may be a part that has an out-of-tolerance assembly error. A reasonable safety margin would be equal to the assembly tolerance, so that the offset distance would be 2X (instead of X in FIG. 4). Thus in the present invention with a safety margin included, the center of rotation would located between L+D and L+D+3X for positive coupling, and between L+D and L+D−3X for negative coupling.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive having a rotatable magnetic recording disk and a recording head that reads data from and writes data to the disk, the disk drive comprising:
    a primary rotary actuator rotatable about an axis for moving the head across the disk;
    a secondary rotary actuator comprising a fixed portion attached to the primary actuator and a movable portion including the head, said movable portion having a center of rotation and a mass M and moment of inertia $I_z$, the movable portion's center of rotation and the primary actuator's rotational axis being intersected by a line and the center of mass of the movable portion being located substantially on said line at a distance L from the primary actuator's rotational axis; and wherein
    said center of rotation is located along said line, said location being selected from the group consisting of
        (a) an optimal location, said optimal location being at a distance D from said center of mass, where D is approximately $I_z/(L*M)$;
        (b) a location between said optimal location and a distance 3X from said optimal location in a direction away from the primary actuator's rotational axis, where X is the assembly tolerance for the location of the center of rotation relative to the center of mass; and
        (c) a location between said optimal location and a distance 3X from said optimal location in a direction toward the primary actuator's rotational axis.

2. The disk drive of claim 1 wherein counter-clockwise rotation of the secondary actuator occurs in response to a counter-clockwise acceleration of the primary actuator, and wherein said center of rotation is located at (a) or (b).

3. The disk drive of claim 2 wherein said center of rotation is located at (b), the secondary actuator has a resonant frequency of vibration, and the phase of the open loop transfer function of the primary actuator servo loop without the secondary actuator, at said resonant frequency, is between 0 degrees and −180 degrees.

4. The disk drive of claim 1 wherein clockwise rotation of the secondary actuator occurs in response to a counter-clockwise acceleration of the primary actuator, and wherein said center of rotation is located at (a) or (c).

5. The disk drive of claim 4 wherein said center of rotation is located at (c), the secondary actuator has a resonant frequency of vibration, and the phase of the open loop transfer function of the primary actuator servo loop without the secondary actuator, at said resonant frequency, is between −180 degrees and −360 degrees.

6. The disk drive of claim 1 wherein the disk drive has a suspension attached to the primary actuator and a slider attached to the suspension, the recording head being located on the slider, and wherein the secondary actuator rotates the slider relative to the suspension.

7. The disk drive of claim 1 wherein the disk drive has a suspension attached to the primary actuator and a slider attached to the suspension, the recording head being located on the slider, and wherein the secondary actuator rotates the suspension.

8. The disk drive of claim 1 wherein the primary actuator is a voice coil motor (VCM) actuator.

9. The disk drive of claim 1 wherein the secondary actuator is an electrostatic actuator.

10. The disk drive of claim 1 wherein the secondary actuator is a piezoelectric actuator.

11. The disk drive of claim 1 wherein the secondary actuator is a moving-coil actuator.

12. A magnetic recording disk drive having a rotatable magnetic recording disk and a recording head that reads data from and writes data to the disk, the disk drive comprising:
    a voice coil motor (VCM) actuator rotatable about an axis and having rigid arm and a suspension attached to the arm;
    a secondary rotary actuator comprising a fixed portion attached to the suspension and a movable portion including a slider, the slider supporting the recording head, the slider rotating counter-clockwise in response to a counter-clockwise acceleration of the VCM actuator, said movable portion having a center of rotation and a mass M and moment of inertia $I_z$, the movable portion's center of rotation and the VCM actuator's rotational axis being intersected by a line and the center of mass of the movable portion being located substantially on said line at a distance L from the VCM actuator's rotational axis; and
    wherein said center of rotation is located along said line between an optimal location and a distance 3X from said optimal location in a direction away from the VCM actuator's rotational axis, said optimal location being at a distance D from said center of mass, where D is approximately $I_z/(L*M)$, and where X is the assembly tolerance for the location of the center of rotation relative to the center of mass.

13. The disk drive of claim 12 wherein the secondary actuator is an electrostatic actuator.

14. The disk drive of claim 12 wherein the secondary actuator is a piezoelectric actuator.

15. The disk drive of claim 12 wherein the secondary actuator is a moving-coil actuator.

16. A magnetic recording disk drive having a rotatable magnetic recording disk and a recording head that reads data from and writes data to the disk, the disk drive comprising:

a voice coil motor (VCM) actuator rotatable about an axis and having rigid arm and a suspension attached to the arm;

a secondary rotary actuator comprising a fixed portion attached to the suspension and a movable portion including a slider, the slider supporting the recording head, the slider rotating clockwise in response to a counter-clockwise acceleration of the VCM actuator, said movable portion having a center of rotation and a mass M and moment of inertia $I_z$, the movable portion's center of rotation and the VCM actuator's rotational axis being intersected by a line and the center of mass of the movable portion being located substantially on said line at a distance L from the VCM actuator's rotational axis; and wherein said center of rotation is located along said line between an optimal location and a distance 3X from said optimal location in a direction toward the VCM actuator's rotational axis, said optimal location being at a distance D from said center of mass, where D is approximately $I_z/(L*M)$, and where X is the assembly tolerance for the location of the center of rotation relative to the center of mass.

17. The disk drive of claim 16 wherein the secondary actuator is an electrostatic actuator.

18. The disk drive of claim 16 wherein the secondary actuator is a piezoelectric actuator.

19. The disk drive of claim 16 wherein the secondary actuator is a moving-coil actuator.

* * * * *